United States Patent [19]
Frank

[11] 3,881,384
[45] May 6, 1975

[54] MACHINE FOR CUTTING FROZEN FOODS
[75] Inventor: Charles J. Frank, Walton Hills, Ohio
[73] Assignee: SCM Corporation, Cleveland, Ohio
[22] Filed: July 16, 1973
[21] Appl. No.: 379,383

[52] U.S. Cl. ............... 83/407; 83/425.1; 83/435.2; 83/444
[51] Int. Cl. ............. B26d 7/06; B26d 4/06
[58] Field of Search .... 83/423, 425.1, 425.2, 425.3, 83/435.2, 444, 446, 447, 404, 407

[56] References Cited
UNITED STATES PATENTS
| | | | |
|---|---|---|---|
| 1,919,964 | 7/1933 | Spang | 83/425.1 X |
| 2,150,735 | 3/1939 | Williams | 83/425.2 |
| 2,506,117 | 5/1950 | Stiefyater | 83/425.3 X |
| 3,349,822 | 10/1967 | Rauth | 83/425.3 X |

Primary Examiner—Willie G. Abercrombie
Attorney, Agent, or Firm—M. H. Douthitt; S. I. Khayat

[57] ABSTRACT

A machine is shown for cutting frozen food slabs, such as frozen fish, into a plurality of portion-sized pieces with cut edges which are oblique to the slab surfaces.

3 Claims, 9 Drawing Figures

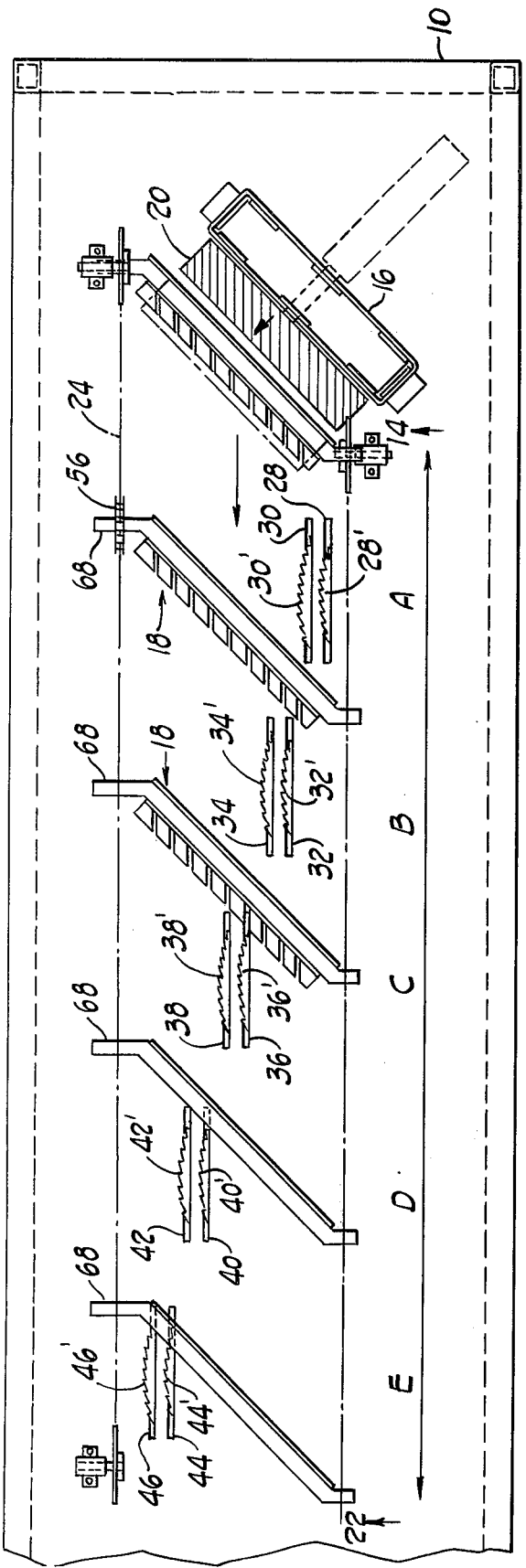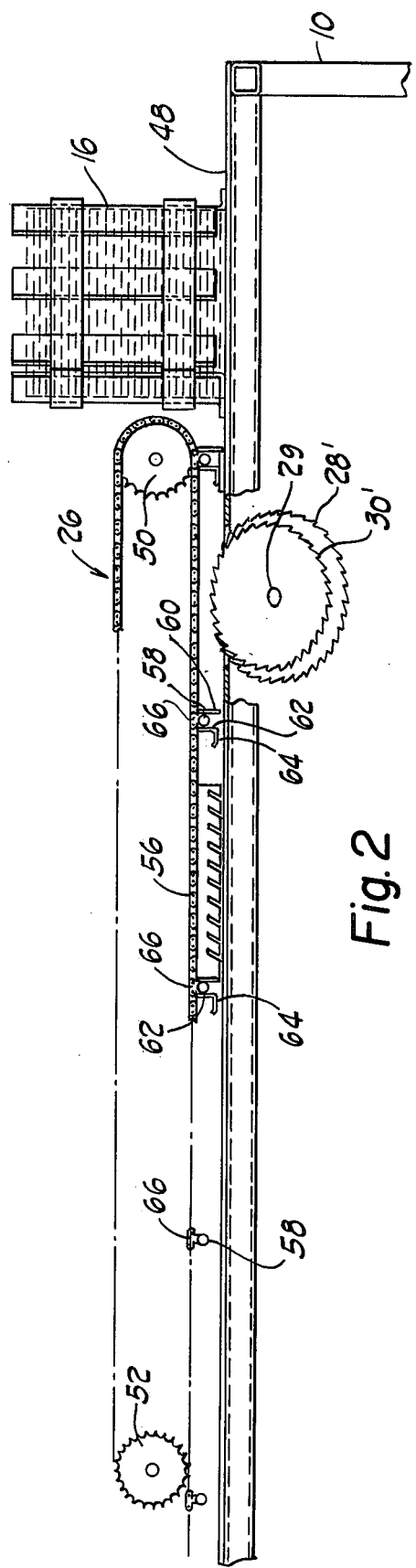

MACHINE FOR CUTTING FROZEN FOODS

BACKGROUND OF THE INVENTION

A. Field of the Invention

The present invention relates to a machine for cutting a series of frozen food slabs into a plurality of cut-up pieces which are of predetermined size and shape. The invention is particularly applicable to cutting of frozen fish slabs, and more particularly to cutting a frozen fish slab in which the cuts are oblique to the slab surfaces producing what is called a French Cut configuration. "French Cut" is the designation defining a parallelopiped shape having the long sides of the cut inclined at an angle of about 40°–60° to the horizontal or to the slab surfaces.

B. Description of the Prior Art

Frozen meat and fish constitute the bulk of the frozen food items which are the subject of the present invention. Generally, the meat or fish is first formed into a block which is frozen to about 0°F. or lower. The low temperature is necessary for storage and subsequent processing of the block. Typically in such subsequent processing, the blocks are cut into slabs of various sizes, depending upon the desired final product. A frozen fish slab, by way of example, may be from three to four inches in width, from 16 to 20 inches in length, and from ¼ to ¾ inch in thickness. These slabs are then cut into frozen cut-up pieces which are battered, breaded and packaged for marketing.

The cutting step conventionally is carried out with a machine provided with a gang of meat saws or knives arranged in a cutting zone in a side-by-side array across the zone to cut the slabs simultaneously into a plurality of pieces of predetermined size. The frozen food slabs are carried on a table or support through which the saws or knives extend, and are stabilized during the cutting operation by stationary holddown means comprising essentially a metal plate positioned over the table from which it is spaced a distance sufficient to allow movement of the slabs along the table. Alternatively, the holddown plate is slotted to accommodate the saw blades. The slabs are fed onto the table from hoppers or feeders equipped with feed-regulating or reciprocating means. Preferably, a pusher means is provided to advance the slabs into the cutting zone, although the sequential feeding of the slabs can provide a self-pushing arrangement.

The aforementioned French Cut shape is obtained by employing a sloping table on which the frozen slabs travel. The saws protrude through slots in the table at an angle of about 45° with regard to the sloping surface of the table. In addition, the saws which are arranged in a line across the table are mounted on a single arbor so that the cuts through the fish slab are made simultaneously.

A number of difficulties have been encountered, particularly in making French Cuts in frozen fish slabs, primarily because of the coarser and more fragile texture of the fish. The sloping table with its parallel holddown plate was thought desirable because it facilitates to the downward movement of the slabs. However, such movement often is uncontrolled giving rise to misaligned positions of the slabs. Also, the simultaneous cutting action by the multiple saws exerts a substantial torque on the slab, which can result in further displacement or misalignment of the slab with regard to its direction of movement As a result, the final cut-up pieces may be irregular in shape.

Another disadvantage experienced with conventional machines is the difficulty of servicing and replacing the saws. Often, the malfunction of a saw blade can require the removal of all the saws and the arbor on which they are mounted. In addition, conventional machines have lacked versatility in the preparation of cut-up pieces of different shapes. Even adjustments to accommodate slabs of different thicknesses have been time consuming.

SUMMARY OF THE INVENTION

These and other disadvantages are overcome in accordance with the concepts of the present invention by providing a machine with a horizontal table having an elongated surface which defines the path or line of travel of the frozen slabs and cut-up pieces resulting therefrom. A plurality of elongated slots is spaced and arranged in a staggered array diagonally across the table. A like plurality of circular saw blades protrudes through said spaced slots in the table, said blades defining an elongated and diagonal cutting zone. The blades rotate in planes angled with regard to the surface of the table, for instance, about 45°, to provide the desired French Cut.

As with the prior art, the frozen food slabs are fed onto the support from a feeder or hopper in a timed sequence. A plurality of pusher and holddown bars, driven by a pair of endless belts, engage the frozen food slabs in timed sequence with the feeder or hopper and move longitudinally above the machine support. The pusher and holddown means are slotted to accommodate the rotating saw blades.

In accordance with the invention, the saw blades are arranged in gangs positioned in the diagonal line which extends across the surface of the support, each gang being offset laterally and longitudinally in the cutting zone with regard to an adjacent gang. In a preferred embodiment each gang is made up of a pair of saw blades. A typical machine can have five such pairs, each successive pair being spaced somewhat further from the receiving end of the machine and each such pair being mounted on a separate arbor. Thus, a slab is submitted to only two cuts at a time reducing the torque to which the slab is subjected. Further, the invention with pusher and holddown bars obviates any tendency for the slabs to slide sideways or to otherwise move in a manner which would result in irregular shaped cuts. In addition, the invention facilitates repair and maintenance of the machine.

BRIEF DESCRIPTION OF THE DRAWINGS

The accompanying drawings are provided herein to better illustrate the invention wherein FIG. 1 is a plan view of a substantial portion of a cutting machine in accordance with a preferred embodiment of the invention;

FIGS. 2 and 3 are an elevation side view and end view, respectively, of the embodiment shown in FIG. 1;

DETAILED DESCRIPTION OF THE INVENTION

Figure 3:
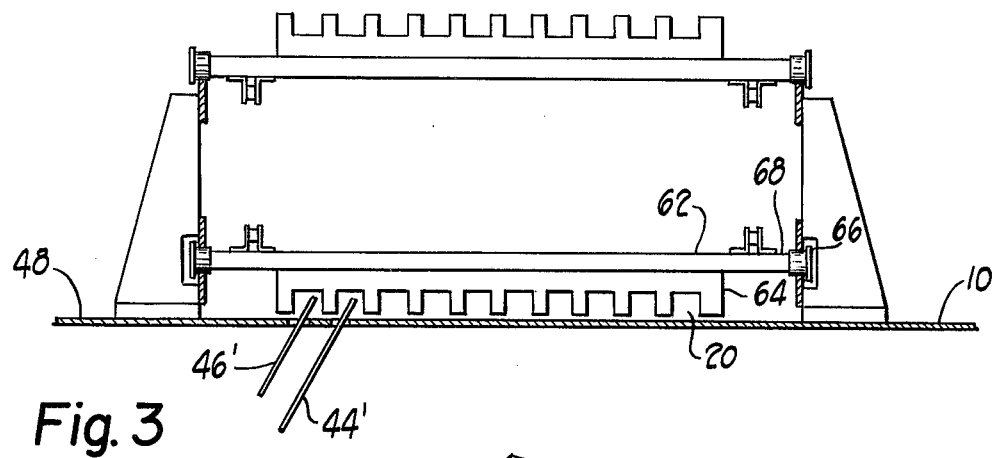

Now referring to FIG. 1, there is shown a machine for cutting frozen food slabs in accordance with the concepts of the present invention. The machine comprises a table or support 10 which defines an elongated path of travel including the diagonal cutting zone A–E. The table has a receiving end 14 adjacent to which a feeder 16 is positioned. A plurality of pusher holddown bars 18 each engages frozen food slab 22 dispensed from the feeder 16 to move said slab 20 from the receiving end 14 through the cutting zone 12 to a dispensing end 22. In the embodiment illustrated, the pusher-holddown bars 18 are carried by a pair of endless roller chains 25–26 positioned above the table or support 10 parallel with the longitudinal side of the table or support.

In accordance with the concepts of the present invention, the table or support 10 is provided with a horizontal surface which may be of metal or other materials of construction. The surface is provided with a plurality of elongated and parallel slots 28, 30; 32, 34; 36, 38; 40, 42; and 44, 46, arranged in pairs at five different cutting sites A, B, C, D, E. The sites are oriented in a diagonal array across the table from one end of the cutting zone 14 to the other, each cutting site being offset laterally and longitudinally from the adjacent site. Thus, each successive pair of slots is positioned further from the receiving end 14 of the machine than the preceding pair.

Referring to both FIGS. 1 and 2, the machine is provided with a plurality of circular saws designated 28′, 30′; 32′, 34′; 36′, 38′; 40′, 42′; and 44′, 46′, the blades of which protrude through their corresponding slots which are dimensioned to allow free rotation of the saw blades. Each pair of saw blades, e.g., 28′, 30′ is mounted on an individual arbor 29, there being five arbors for the five pairs of circular saws or cutting sites. For convenience, circular saws 11 inches and 13½ inches, in diameter, have been found satisfactory. Only arbor 29 is shown. The saw blades are inclined at an angle between about 40° and 60° with respect to the surface 48 of the table 10, for instance, at an angle of about 45°. The blades protrude from the slots to a height slightly above the thickness of the frozen fish slab 20, generally three-fourths of an inch or less. The arbors are suitably driven by a drive means (not shown) in a clockwise direction so that the saw blades are cut in a direction opposite to the direction of advance of the slabs. Advantageously, the saw blades are easily removable from the arbors; and the arbors are individually removable from the cutting machine so that one or more pairs of saw blades can be removed for maintenance and repair or for accommodating slabs of smaller size without dismantling the entire machine.

The pusher-holddown assembly 18, which includes the pusher and holddown bars, and endless chain mechanism 24–26, are best illustrated in FIGS. 1, 2 and 3. The endless chains are carried on two pairs of sprockets positioned on opposite sides of the machine at the receiving and dispensing ends 14 and 22, respectively, so that the chains travel in vertical planes parallel to the longitudinal sides of the table or support 10. Only two sprockets 52 and 54 for roller chain 26 are shown. A plurality of the pusher-holddown bars 18 are carried by the opposed endless chains at spaced intervals on the chains. This is accomplished in the embodiment shown by the use of specially shaped link members 56 interposed in the chain at spaced intervals. The link members are provided with a flange or pin 58 which engages opposite ends of the pusher-holddown bars assembly 18.

The pusher-holddown bars assembly 18 is generally U-shaped in cross-section with a downwardly extending pusher portion 60 in the form of a flap plate which extends almost to the surface of the table 10 when the pusher or holddown bars are on the lower run of endless chains 24–26. On the leading side of the pusher portion 60, there is provided a holddown portion 62. This is a portion which extends downwardly, in the form of a flap plate, but which is flanged with a forwardly extending horizontal flange portion 64, at an elevation spaced from the surface of the table 10 a distance essentially the same as the thickness of the slabs being cut.

As illustrated in FIG. 3, the end view of the holddown bar 64 is slotted to accommodate the saw blades which protrude above the table slots. Here, only the last two saw blades 44′ and 46′ are shown. The pusher and holddown bar slots are relatively wide since the saw blades are angled with respect to the table surface.

Attachment of the pusher and holddown bars assembly 18 to the endless chains is accomplished by employing a circular bar 66 which extends between the flange portions of link members 56. This circular bar in turn supports an intermediate elongated connector block 68 to which the pusher and holddown portions are attached. Shown in FIG. 1, the bar is angled at opposite ends so that it attaches to the link member 56 at right angles but extends across the table surface in an angled direction. The purpose of this is to help orient the food slab (i.e., frozen fish slabs) at an angle with regard to the direction of travel of the slabs in the machine. This can be varied depending upon the nature of the cuts desired.

In operation, the feeder 16 also referred to as hopper at the receiving end of the table 10 is positioned at the desired angle above the table, housing from 10 to 15 slabs of frozen food. A reciprocating plate (not shown) at the bottom of the feeder ejects the lowermost slab onto the table 10 and into position for engagement with an incoming pusher and holddown bars assembly. The movement of the endless belt carrying the assembly and the action of reciprocating plate are synchronized in such a manner that soon after the slab 20 is ejected pusher-holddown bars assembly arrives to engage said slab. Thus, the time at engagement lags slightly behind the time of slab ejection. Alternatively, the feeder can be positioned to deposit the slabs in the desired place by gravitational force with the help of guides (not shown). Also, if desired, the feeder can be positioned below the surface of the table 10 so that the top slab is ejected onto the table for engagement with the pusher-holddown bars assembly. In practice employing the depicted preferred embodiment, the frozen slabs move at the rate of approximately 90 slabs per minute. As the fish slab advances across the table it is cut by the first pair of saw blades 28′, 30′ and then by successive pairs in sequence. Throughout the path of travel on the table 10, the slabs are held firmly and experience no lateral movement. After the slabs are cut by the five pairs of saw blades, the cut-up pieces produced therefrom are moved from the dispensing end 22 of the machine for additional processing, such as battering, breading and packaging.

Figure 4:
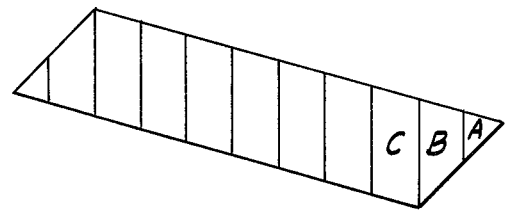
FIG. 4 is an isometric view of a frozen fish slab.

FIG. 4 depicts an isometric view of a frozen fish slab (3½ × 18 × ½ inch) oriented to the cutting position. The diagonal lines shown on the slab represent the cut edges to be made by the five pairs of saw blades.

Figure 5:
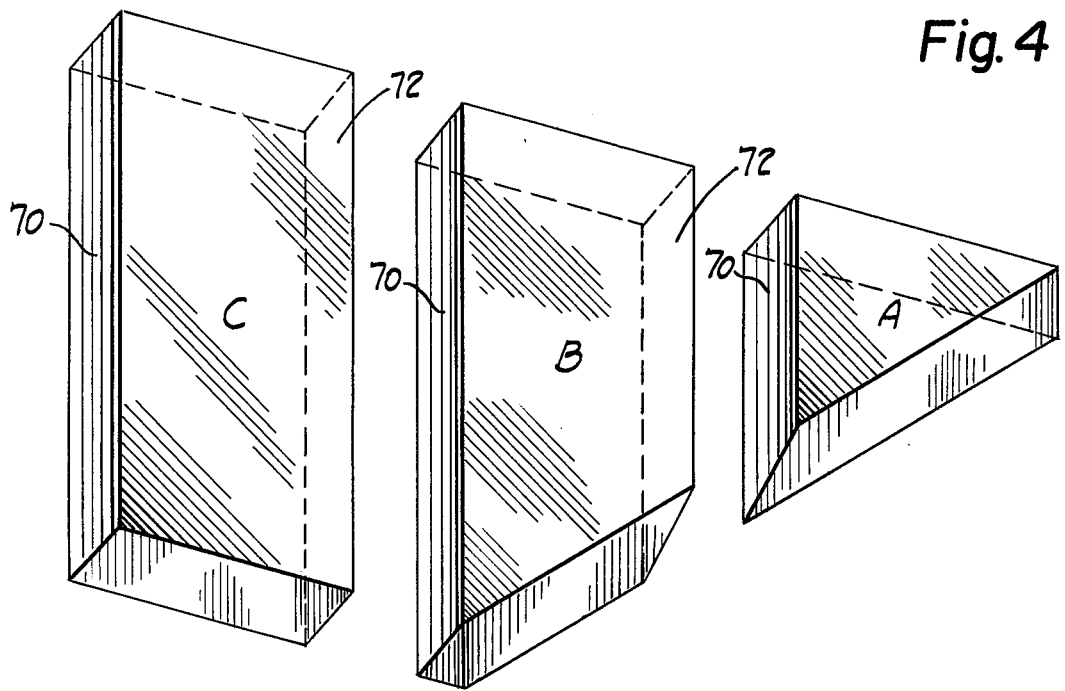
FIG. 5 is an exploded view of cut-up pieces of the slab shown in FIG. 4.

FIG. 5 illustrates the final shapes of the cut-up pieces, piece C with parallelopiped shape representing the desired shape known as "French Cut." The longitudinal edge 70 and the hidden edge 72 of piece C are angled with regard to its surfaces due to the orientation of the saw blades, the angle being 45°. Piece B with its trapezoidal shape is known as a "tip cut" and piece A with a triangular shape is known as an "end cut." Advantageously, the cutting machine of the present invention has made possible the consistent production of seven, substantially identical French Cut pieces out of each frozen fish slab as shown in FIG. 4. Conventional machines were not capable of doing so.

Figure 6:
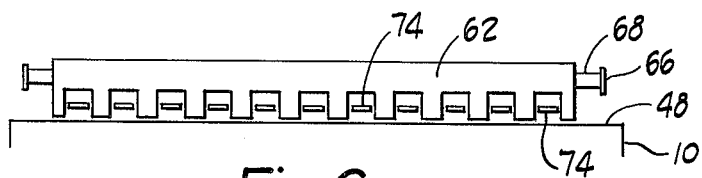
FIGS. 6, 7, 8, and 9 show modified embodiments of the support, holddown, and pusher means of the invention.

FIG. 6 is a schematic end view of a machine as described in FIGS. 1, 2 and 3 except for the pusher-holddown bars assembly. Here, the same pusher bar 62 is connected to the endless belt through the same type of connector block 68, links 66 and roller chains 24–26. The holddown bar, however, is now a slotted plate 74 positioned above the table 10. Slotted plate 74 is parallel to the table's surface 48 with which it defines a space for the slab to move through said space being adjustable with the thickness of the slab. The slotted plate 74 conventionally is stationary. However, it can be movable as a part of a conveyor means (not shown) independent of the one moving the pusher bar 62.

Figure 7:
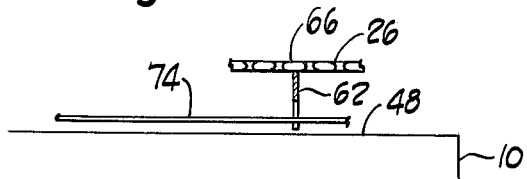

FIG. 7 is a schematic side view of the embodiment of FIG. 6, wherein the vertical bar 62 represents the pusher bar means which, in turn, is connected to the overhead conveyor means (not shown), through link 66. Holddown plate 74 is positioned parallel to support 10 with the area in between being adjustable to allow passage of the slab 20. In FIG. 7 the holddown plate 74 should not be construed only as a stationary fixed plate. As stated earlier, the plate can be movable and the movement in the direction of the path of travel can be effected by another independent conveyor means (not shown).

Figure 8:
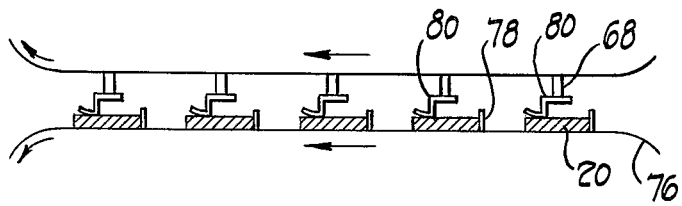
Figure 9:
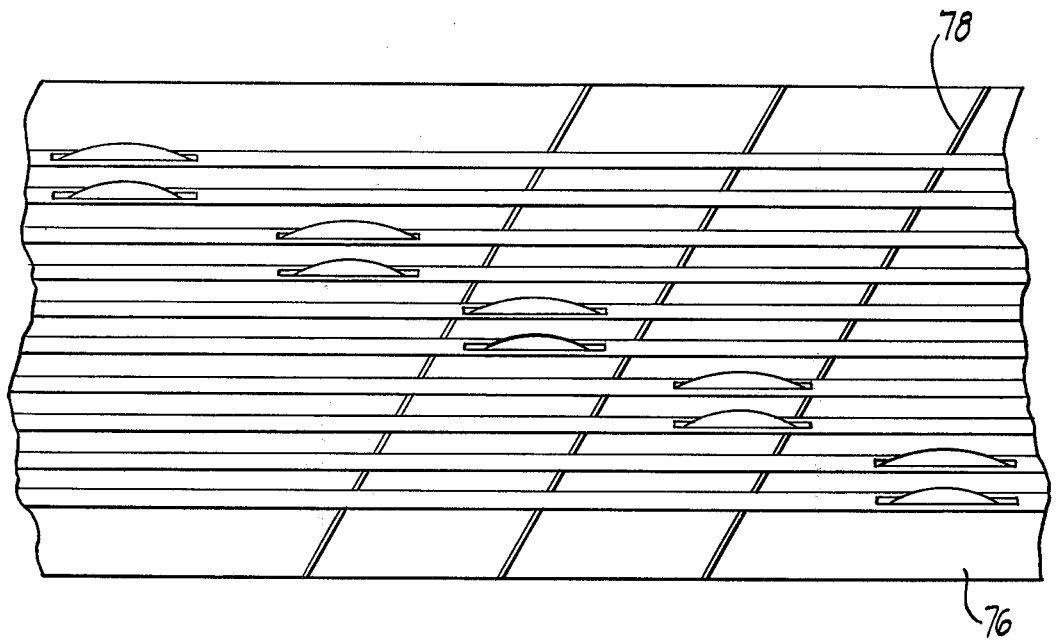

FIGS. 8 and 9, respectively, show a side view and a plan view of another embodiment in accordance with the present invention. These embodiments are directed to movable support and pusher means. Thus the holddown means 80 depicted here is substantially the same as that described in FIGS. 1, 2, and 3. The pusher means, however, is now part of the movable support 76 in the form of vertical projection 78. Movable support 76 is, in effect, a part of an independent conveyor means (not shown), moving in the same direction as the conveyor overhead carrying the holddown bars, said support being slotted or divided, for example, into a plurality of belts to accommodate the various saw blades as detailed in FIG. 9. For efficiency and economy the movements of the two conveyors are timed in such a manner that the slab 20 is ejected onto the movable support 76 before the on-coming pusher projection 78. The holddown means 80 restrains the upward movement of slab 20 as well as its misalignment because slab is held tightly against the pusher projection and the support. Again, considering FIGS. 7, 8 and 9 only one driven conveyor means is needed for movable support 76 having thereon the follower projections to advance the slabs which are contained by the slotted plate 74.

It should be noted that with the aforementioned embodiments the saw blades are maintained in the same position described earlier, i.e., inclined at an angle between 40° and 60°, to effect the desired French Cut. It is preferred that the saw blades are circular in shape.

The machine of the present invention is considerably more efficient than prior art machines. Frequent servicing and replacement of the saw blades as well as time spent on cleaning can be minimized significantly. This is reflected in improved productivity while maintaining superior quality control of the size of the cut-up pieces.

What we claim is:

1. A machine for cutting a series of similar frozen food slabs at low temperature, each into a plurality of cut-up pieces which comprises: an essentially planar, elongated support for said slabs, the surface of said support defining along its length a part of travel for said slabs and the resulting cut-up pieces thereof, said support having a plurality of elongated slots along its length, said slots being spaced and arranged in a diagonally staggered array of several locations;

a plurality of toothed saw blades each protruding through said slots in said support there being one or a gang of blades at each of said locations, each of said blades being disposed for intercepting and cutting through said slabs against supporting pressure exerted thereon from said support, all of said blades being substantially parallel to each other and being inclined in a plane oblique to the plane of said support at an angle between about 40° and 60°;

drive means for said blades;

driven conveyor means adapted for propelling said slabs into and through, and the resulting cut-up pieces thereof away from cutting relationship with said blades, said conveyor means being equipped with a plurality of gangs of follower projections, the follower projections of each said gang of follower projections being arrayed for engaging the trailing edge of a slab and the cut-up pieces therefrom and restricting rearward motion thereof in said path of travel;

drive means for said conveyor means: and slotted slab holddown means for restraining upward movement of said slabs and the cut-up pieces therefrom while they are moving forwardly in said path; said holddown means being a portion of said conveyor means.

2. The machine or claim 1 wherein said support is a stationary support, said conveyor means is independent of said support, and said holddown means is a portion of said conveyor means.

3. The machine of claim 1 wherein said blades are circular saw blades, said conveyor means is chain conveyor means, and automatic slab feed means is disposed for feeding slabs sequentially onto said support between said gangs of follower projections.

* * * * *

UNITED STATES PATENT OFFICE
CERTIFICATE OF CORRECTION

PATENT NO. : 3,881,384
DATED : May 6, 1975
INVENTOR(S) : Charles J. Frank

It is certified that error appears in the above-identified patent and that said Letters Patent are hereby corrected as shown below:

Claim 1, line 22, change "part" to "path".

Signed and Sealed this twenty-ninth Day of July 1975

[SEAL]

Attest:

RUTH C. MASON
Attesting Officer

C. MARSHALL DANN
Commissioner of Patents and Trademarks